United States Patent Office 2,944,096
Patented July 5, 1960

2,944,096

PROCESS FOR ISOMERIZING LIGHT NORMAL ALKANES

John W. Teter, deceased, late of Chicago, Ill., by Ruth Young Teter, administratrix, Chicago, and John L. Gring, Homewood, Ill., and Carl D. Keith, Munster, Ind., assignors to Engelhard Industries, Inc., a corporation of New Jersey No Drawing. Filed Oct. 19, 1956, Ser. No. 616,920

5 Claims. (Cl. 260—683.65)

This invention relates to an improved method for the isomerization of light, normal alkanes, particularly normal butane, normal pentane, normal hexane or mixtures thereof.

It has heretofore been proposed in the art to isomerize light, normal alkanes. Thus, when isobutane is produced by the isomerization of normal butane, the isobutane can be employed as a part of the charge stock to an alkylation unit. On the other hand, isopentane and isohexane produced by the isomerization of normal pentane and normal hexane, respectively, represent improved gasoline components, when compared with the materials from which they are derived. Various methods have heretofore been proposed in the art for the isomerization of normal alkanes, involving the use of catalysts such as aluminum halides including aluminum chloride and aluminum bromide or sulfur acids including sulfuric acid, ethane sulfonic acid, chlorosulfonic acid and fluorosulfonic acid. Hydrogenation catalysts have also been proposed, including platinum-alumina-combined halogen catalysts; nickel, cobalt or platinum supported on silica-alumina; molybdenum or tungsten oxide on silica-alumina and molybdenum oxide on alumina.

Any practical process for the isomerization of normal butane, normal pentane or normal hexane must meet at least two requirements. In the first place, the process must result in a relatively high conversion of the normal alkane to other materials, so that an undue amount of the normal alkane does not pass through the reaction system unchanged. At the same time, the conversion reaction must be selective, that is, a relatively large proportion of the normal alkane converted must be converted into the desired iso compound.

In accordance with the present invention, it has been found that the platinum-alumina catalyst of application Serial No. 288,058, filed May 15, 1952, and now abandoned, and its continuation-in-part application Serial No. 489,726, filed February 21, 1955, now Patent No. 2,838,-444, is particularly effective in catalyzing the isomerization of normal butane, normal pentane, normal hexane or mixtures thereof, in that the catalyst is highly effective in converting those materials in an exceptionally selective fashion. This catalyst contains about 0.1 to about 1.0% of platinum in finely dispersed form on an alumina base which is derived from a precursor alumina hydrate composition which predominates in the trihydrate form of alumina. Usually about 65 to about 95 weight percent of the precursor hydrate is trihydrate comprising one or more of the gibbsite, bayerite and randomite forms as defined by X-ray diffraction analysis. The substantial balance is amorphous or monohydrate-type alumina. The trihydrates are present as well-defined crystallites, that is, they are crystalline in form when examined by X-ray diffraction means. The calcined catalyst is characterized by a large surface area ranging from about 350 to about 550 or more square meters per gram in the virgin state as determined for example by the BET adsorption technique. The calcined catalyst also has a large portion of its pore volume in the pore size range of about 100 to 1000 angstrom units, generally having about 0.1 to about 0.5 and preferably about 0.15 to about 0.3 cc. per gram of pore volume of this range. The crystallite size of the precursor alumina trihydrate also is relatively large and usually is in the 100 to 1000 angstrom unit range.

When the isomerization operation of the present invention is carried out, the reaction conditions should be adjusted so that at least about 30 percent of the normal alkane fed to the operation is converted to other products and also so that, of the normal alkane converted, at least about 60 percent is converted to the isomer of the same number of carbon atoms. These conditions are generally met by employing a reaction temperature within the range from about 800 to 900° F., a reaction pressure from about 200 to 500 p.s.i.g. and a weight hourly space velocity (WHSV, weight units of normal alkane fed per weight unit of catalyst per hour) from about 2 to 20. The isomerization is conducted while the normal alkane is in admixture with hydrogen, generally from about 1 to 5 moles of hydrogen being introduced into the reaction system per mole of normal alkane fed. As the examples given below illustrate it is not essential that the normal alkane or normal alkane mixture, fed to the reaction system be absolutely pure. Normal alkanes produced by conventional petroleum refinery operations can be employed as a feed in the present process. In general, however, the normal alkane feed will contain at least about 80 mole percent of normal butane, normal pentane, normal hexane, or mixture thereof, the remainder being hydrocarbons of similar boiling point. Also, the hydrogen employed in the operation need not be absolutely pure, streams containing a high proportion of hydrogen such as are generally found in petroleum refinery operations being suitable for use in the process. Such streams will generally contain at least about 75 mole percent of hydrogen, the remainder being light hydrocarbons, such as methane, ethane and ethylene.

When the present process is carried out, the normal alkane undergoing isomerization is in vapor phase, and any of the methods conventionally employed in the art for contacting the reactant and catalyst can be utilized. Thus, the catalyst can be dispersed in a fixed bed, in a moving bed, or in a fluidized bed, and the operation can be either batchwise or continuous. Normal alkane which passes through the reaction system unchanged can be recovered, if desired, and recirculated, recovery being effected by precise fractionation, by selective adsorption and the like. Among the adsorbents which are particularly useful are crystalline sodium and calcium alumino-silicates which have been heated to remove their water of hydration, resulting in the formation of crystals which are highly porous. Such crystalline silicates are commercially available materials and have pores of molecular dimensions, only about 15–20 billionths of an inch in diameter. The silicates are known to be effective for the purpose of separating straight-chain aliphatic compounds from cyclic and branched-chain compounds due to the fact that the straight-chain molecules are small enough to enter the pores and be adsorbed, while the cyclic and branched-chain molecules are not.

In preparing the catalyst of applications Serial Nos. 288,058 and 489,726 the alumina hydrogel may be formed for example by precipitating the gelatinous hydrous oxide from a solution of a soluble aluminum salt such as aluminum chloride. Other soluble sources of aluminum can be employed, for example aluminum sulfate or sodium aluminate, although subsequent removal of sulfate ion, for example, by washing may occasion more difficulty than chloride ion. Ammonium hydroxide is a useful agent for precipitation of the alumina hydrogel from the salt solution. In the gel-forming step pH control is important in obtaining a good rate of conversion, and it is desirable to maintain a pH between about 7 to about 10. For instance, if the pH be too low, the conversion to trihydrate may be inhibited. As an incident to the gel-forming step, extraneous ions introduced in preparation such as chloride ion are removed by washing with water. For example, it is usually desirable to reduce chloride ion to a concentration of less than about 0.2%.

The conversion of the alumina hydrogel to the desired precursor alumina system may be effected in various ways as by aging the hydrogel which is maintained at a pH of about 7 to about 10 for a period of several days or as by seeding the hydrogel in the preparation process with crystallites of gibbsite, for example. The transition to the desired phase system predominating in the crystalline trihydrate forms of alumina may be roughly controlled with experience by visual observation. The translucent hydrogel takes on a decidedly whiter and more opaque appearance as the crystalline forms grow and cause light scattering. However, it is desirable to control the transition by sampling, drying the sample to say about 110° C. and determining the distribution of hydrate phases by the technique of X-ray diffraction analysis. Pore volume determinations and surface area measurements as by the BET method are also useful. By this means, the preparation procedure with given materials, operating techniques and equipment may be standardized and then may be controlled as seems necessary with spot analytical checks.

The platinum may be incorporated into the alumina base by adding an aqueous solution of chloroplatinic acid, for example, to the precursor alumina compositions followed by precipitation in situ by aqueous hydrogen sulfide solution or by gaseous hydrogen sulfide. Another method of platinum incorporation is to admix a platinum sulfide sol of desired concentration with the precursor alumina composition. The resulting slurry in any case is dried, and preferably, the drying operation is conducted rapidly. For example, the drying should be completed in not more than about 24 hours at about a pH of 6 to 9. Various expedients may be applied to accelerate drying by exercising appropriate precautions. For example, the mixture may be dried using a rotary drum type drier, or it may be pre-filtered to reduce water content and chloride content prior to drying in an oven, or it may be dried using a drum drier after reslurrying, or it may be spray dried. If desired, the platinum may be incorporated into the aged hydrate base after the base has been dried. Alternatively, the aged hydrate base may be impregnated with platinum after drying and partial to complete removal of water of crystallization. However, an advantageous method is that which includes impregnation of the base before drying.

The dried alumina catalyst mixture then may be formed by a tableting or extruding operation. If the catalyst is to be in finely divided form, the grinding operation may follow calcination. In the case of tableting it is customary to incorporate a die lubricant which advantageously is organic and can be burned out by oxidation in the calcination step. The calcination is effected by burning with an oxygen-containing gas, e.g. by heating the catalyst in the presence of the flowing gas stream at a temperature of about 750° to about 1100° F. for a period of 6 hours. Higher temperatures, e.g. 1200° F., may be employed but the calcination should not be continued to the point of undue catalyst sintering. The calcination can be initiated with a mixture of air and nitrogen and completed with air. When calcining extruded catalyst containing no organic material the use of nitrogen is not necessary. Before use the catalyst can be reduced by subjecting it to contact with flowing hydrogen at a similar temperature and for a period of several hours, e.g. 900° F. and atmospheric pressure for about 1 to about 12 hours. The calcined catalyst contains generally upwards of about 2% by weight of matter volatile at 1100° C. and if calcined at 900° F. with dry air and cooled with dry air, such volatile matter constitutes from about 2 to about 5% of the weight of the catalyst.

The catalyst compositions contain about 0.1 to about 1 weight percent platinum. The form in which the platinum metal is present is not certain except that it is not detectable by X-ray diffraction methods. Thus, if the platinum metal be present as metal crystallites the fact that they are not detectable by X-ray diffraction methods indicates crystallite sizes of less than about 50 angstrom units. Excess platinum metal in forms detectable or undetectable by X-ray diffraction techniques may be present but has not been found to provide any advantage justifying the expense. Also as noted above, the catalysts are characterized by the existence of the alumina base as a mixture of modifications of gamma alumina which correspond to and derive from a precursor base composition in the uncalcined catalyst of alumina hydrate phases which predominate in the crystalline trihydrate form. By this it is meant that the percentage of alumina in the form of trihydrates must exceed 50% and preferably approximates about 65 to about 95% by weight of the total alumina hydrate composition. The trihydrates present may be gibbsite, bayerite and randomite, and the last of which appears to be a trihydrate of crystalline form intermediate the structure of gibbsite and bayerite. It has also been observed that it is essential to provide in the precursor phases either by separate addition or by control of the hydrate aging at least about 5% and preferably about 10 to about 35% by weight of the alumina monohydrate [(AlO)OH] or amorphous hydrous alumina or their mixture.

The catalysts made from aluminas containing high percentages of the trihydrates in the precursor alumina mixtures have considerable pore volume in the 100 to 1000 angstrom units pore size range. For example, pore volume distributions determined as a result of nitrogen adsorption-desorption isotherm methods and analysis show that these catalysts generally have about 0.10 to about 0.5 and preferably about 0.15 to about 0.3 cc./gram of their pore volume, which corresponds to about one-half the total pore volume, in pores greater than about 100 angstrom units pore size. In the distribution of pore sizes below about 100 angstrom units, there appears to be little difference that can be correlated with catalyst properties.

The large pores may be formed from the trihydrates because of the fact that the trihydrates in the uncalcined state are indicated by X-ray diffraction as crystalline materials of about one hundred to about one thousand angstrom units crystallite size. These large pores are not formed during calcination but actually exist in the uncalcined alumina. The large pores do not exist in alumina bases derived from the boehmite or monohydrate form of precursor alumina, either before or after calcination. The boehmite type of precursor alumina is characterized by small crystallite size of the order of 40 angstrom units before and after calcination and contains substantially no pores larger than 50 angstrom units. It appears however that the presence of a minor proportion of the boehmite form or the amorphous hydrous alumina or their mixture in the precursor mixture is advantageous to insuring maximum retention of large pore volume in addition to the normal fine-pore structure during catalyst preparation. Thus these catalysts characterized by the larger pore volumes contain about 5 to about 35 weight percent of boehmite or amorphous hydrous alumina or their mixture in the precursor mixture.

In addition to pore size and pore volume distribution, the nature of the precursor aluminas influences the ultimate structure and state of the catalyst in other ways that appear to be significant with respect to catalyst performance. Where the monohydrate has crystallite sizes of about 30 to 40 angstrom units and relatively high surface area, e.g. about 300 square meters per gram determined by nitrogen absorption methods, the crystallite sizes in the uncalcined trihydrate mixture seem to range largely from about 300 to about 1000 angstrom units and the surface area approximates only about 60 to about 250 square meters per gram. After calcination of the trihydrate, the alumina crystallite sizes predominantly seem to fall in the range of about 35 to about 65 angstrom units and the surface area ranges from about 350 to about 550 or somewhat more square meters per gram. If the catalyst base be calcined before platinum impregnation, the area may be somewhat less than about 350 square meters per gram. This situation, i.e. the increase of surface area when the alumina trihydrate is calcined may have an important influence on the ultimate state of dispersion and the crystallite size of the platinum in the catalyst. Considered together the average crystallite size of the trihydrate phases, determined dry before calcination, and the pore volume distribution after calcination may be an indication of base structure accessibility related to catalyst activity and stability.

It has also been observed by X-ray diffraction studies that the platinum which is effective in these catalysts is not detectable by X-ray diffraction studies and thus does not appear as definite lines. Thus, the effective platinum is in sufficiently finely divided form as to exhibit by X-ray diffraction studies, the substantial absence of crystallites and crystals of size larger than about 50 angstrom units. A surprising property of the finely dispersed platinum is that it is dissolved to a substantial extent in strong sulfuric acid. This observation suggests that the active platinum may be in some combined form rather than in the form of metallic platinum. These catalysts may be promoted by addition of halogens such as fluorine and chlorine. Also, other metals of the platinum group can be used instead of platinum, e.g. rhodium, ruthenium, palladium, osmium and iridium.

Typically the catalyst is prepared according to the following procedure.

CATALYST PREPARATION

A. Description of alumina hydrate base

The base for this catalyst, 400E-9757, was an alumina hydrate which was 71 days old. The composition of the dried hydrate (by X-ray diffraction) was: 29% gibbsite, 42% bayerite, 22% randomite, 6% boehmite and traces of amorphous. The crystallite size of the trihydrate phases appeared to be small.

The base was prepared by adding $1NH_4OH:1H_2O$ to a solution of vigorously stirred $AlCl_3 6H_2O$ (1# of $AlCl_3 \cdot 6H_2O/2$ l. of deionized water) until the pH equaled 8.0. The hydrate was filtered from the mother liquor and washed to 0.27% Cl (by filter press washing procedure). Reslurries were made using approximately 3 gal. of deionized $H_2O$/lb. of $Al_2O_3$ and the pH of the slurries was adjusted to 8.0 (first re-slurry), 9.0, 8.5 and 8.5 (fourth re-slurry). The washed hydrate was aged as a filter cake.

B. Impregnation of alumina hydrate base 2 l. of alumina hydrate slurry (containing 123 g. $Al_2O_3$/l.) was placed in a 3 gal. stoneware jar and stirred vigorously for 30 minutes to effect thorough dispersion. With continued stirring, a platinum solution consisting of 34.3 ml. of $H_2PtCl_6$ solution (0.043 gm. Pt/ml.)+170 ml. of deionized water was added over a 5-minute period. After 10 minutes' additional stirring, hydrogen sulfide (343 ml. of deionized water saturated with $H_2S$ at 78° F.) was added slowly. The slurry was stirred an additional 30 minutes prior to drying. The resulting slurry was very thin and light brown in color.

C. Drying, tableting and calcination

The slurry from above was poured into a Pyrex tray and placed in an Aminco (forced air) oven at 110° C. After a few hours it was noted that the drying was not uniform and a hard rubber-like film had formed on the surface. This film could be redispersed in undried portion of slurry; therefore, to make the slurry (probably 40–50% solids) homogeneous, it was placed in a Waring Blendor for about 30 seconds. The drying was then completed at 110° C.

The dry catalyst was ground to pass 20 mesh, mixed with 2% Sterotex and formed as $\frac{5}{32}''$ tablets. The Sterotex was burned out at 900° F. using 5 parts of air plus 300 parts of $N_2$ atmosphere; the $O_2$ content was then slowly increased, and finally the catalyst was calcined 6 hours at 900° F. in straight air.

D. Reduction of catalyst

Before use the platinum of the catalyst is reduced to the metallic state through contact with hydrogen. For instance, the catalyst can be reduced by contact with flowing hydrogen at atmospheric pressure and elevated temperatures, e.g. 900° F.

The following specific examples will serve to illustrate the present invention but are not to be considered limiting:

EXAMPLE I

A series tests was performed employing in each test platinum-alumina catalyst prepared in the manner described in applications Serial Nos. 288,058 and 489,726. The catalyst contained 0.6 weight percent of platinum supported on alumina and was $\frac{1}{16}$ inch size broken extrudate having a length of about $\frac{1}{8}$ inch on the average. The catalyst comprised calcined alumina and the platinum and was characterized by large pore, high area base structure essentially composed of gamma-alumina modifications resulting from the drying and calcination of a mixture of precursor hydrous alumina phases containing about 80 percent of trihydrate. The platinum metal was present in sufficiently finely divided form as to exhibit, by X-ray diffraction studies, the substantial absence of crystallites and crystals of size larger than 50 angstrom units and, after calcining and before use, had an area (BET method) of 507 square meters per gram. In each test, the fresh catalyst was diluted with 16–20 mesh tabular aluminum and placed in a one inch inside diameter Universal stainless steel reactor. The top of the catalyst bed was covered with 100 grams of the tabular alumina, and the entire length of the bed in the reactor, including the 100 grams of tabular alumina, approximated 17 inches.

The reactor, after each charging, was placed in a bronze-block furnace controlled by thermostats. Bed temperatures were measured by means of chromel alumel thermocouples. Each charge of catalyst was purged with nitrogen gas and then reduced overnight in a slow stream of hydrogen gas at about 900° F. and atmospheric pressure. Before test No. 11, the catalyst charge was treated overnight in a slow stream of hydrogen containing 22 mm. of mercury vapor pressure of water, the temperature being about 900–925° F. and the pressure being atmospheric.

Phillips "pure grade" normal pentane was employed as the normal alkane feed for the tests. It was introduced into the reactor from a graduated blow-case and before being introduced was dried using activated alumina and crystalline sodium alumino-silicate adsorbent. Dry, oxygen-free hydrogen was used in all tests but No. 11. In that test the dry hydrogen was bubbled through to water saturators maintained at room temperature, giving a partial pressure of water vapor within the reactor of 22 mm. of mercury.

Each fresh charge of catalyst was purged with nitrogen gas, then reduced overnight in a slow stream of hydrogen at about 900° F., all at atmospheric pressure. Before test No. 11 was performed the catalyst charge was treated overnight in a slow stream of hydrogen containing water vapor in amount such that its partial pressure was 22 mm. of mercury, the catalyst being maintained at 900–925° F. while undergoing this treatment.

In performing the various tests, the system was first pressured, hydrogen flow was started and the hydrocarbon cut in. After flow rates, temperatures and pressures were lined out, the test was started. Products were then collected and analyzed. For most of the tests, a low-temperature Podbielniak analysis (LTP) of the condensable liquids was obtained. For other tests, however, the mass spectograph (mass spec.) was used.

The operating conditions and test results are set forth in Table I.

TABLE I

| Test No. | 1 | 2 | 3 | 4 | 5 | 6[1] | 7[1] | 8[1] |
|---|---|---|---|---|---|---|---|---|
| Catalyst, Gms. | 15.0 | 40.0 | 25.0 | 25.0 | 40.0 | 15.0 | 15.0 | 15.0 |
| Temp., °F. | 800 | 800 | 860 | 860 | 860 | 860 | 860 | 860 |
| Press., p.s.i.g. | 200 | 200 | 200 | 200 | 200 | 200 | 100 | 500 |
| WHSV | 10.0 | 5.0 | 10.2 | 5.1 | 2.0 | 10.0 | 9.9 | 9.8 |
| Mole Ratio, $H_2/H'C$ | 5.0 | 5.1 | 4.9 | 4.9 | 5.1 | 5.1 | 5.0 | [2]5.2 |
| Wt. Percent Condensibles | 96.2 | 97.0 | 93.4 | 92.6 | 85.0 | 92.6 | 96.2 | 98.7 |
| Wt. Percent Dry Gas | 2.9 | 2.8 | 5.7 | 6.7 | 14.1 | 6.1 | 3.1 | 1.9 |
| Loss | 0.9 | 0.2 | 0.9 | 0.7 | 0.9 | 1.3 | 0.7 | −0.6 |
| Wt. Percent $iC_5$ based on fresh feed | 33.5 | 36.3 | 46.3 | 49.3 | 46.5 | 42.9 | 41.5 | 26.2 |
| Wt. Percent $nC_5$ based on fresh feed | 61.0 | 57.6 | 43.5 | 38.2 | 25.6 | 49.8 | 53.7 | 69.0 |
| Mole Percent $n-C_5$ Remaining | 61.0 | 57.6 | 43.5 | 38.2 | 25.6 | 49.8 | 53.7 | 69.1 |
| Total Conversion, Mole Percent | 39.0 | 42.4 | 56.5 | 61.8 | 74.4 | 50.2 | 46.3 | 30.9 |
| Mole Percent to $iC_5$ | 33.5 | 36.3 | 46.3 | 49.3 | 46.5 | 42.8 | 41.5 | 26.2 |
| Balance, Mole Percent | 5.5 | 6.1 | 10.2 | 12.5 | 27.9 | 7.4 | 0.90 | 4.7 |
| Selectivity | 0.86 | 0.86 | 0.82 | 0.80 | 0.63 | 0.85 | 0.90 | 0.85 |
| $iC_5/nC_5$ | 0.55 | 0.63 | 1.07 | 1.29 | 1.82 | 0.86 | 0.77 | 0.38 |

[1] Condensible liquids analyzed directly by mass spec. without LTP.
[2] Catalyst pretreated ca. 16 hrs. with $H_2$+22 mm. Hg vapor pressure of $H_2O$. Test made with $H_2$.

When the isomerization is carried out not employing a reaction temperature within the range from about 800 to 900° F., a reaction pressure from about 200 to about 500 p.s.i.g., a weight hourly space velocity of from about 2 to 20 and a hydrogen to normal alkane feed ratio of from about 1 to 5 molar, the results obtained are generally not nearly so beneficial as those which are realized when the aforementioned reaction conditions are utilized. This is shown by the results set forth in Table II. These results were obtained using the same procedure which has already been described for the test runs set forth in Table I.

TABLE II

| Test No. | 9[1] | 10 | 11 | 12[1] | 13[1] |
|---|---|---|---|---|---|
| Catalyst, Gms. | 5.0 | 5.0 | 15.0 | 5.0 | 5.0 |
| Temp., °F. | 860 | 935 | 935 | 860 | 860 |
| Press., p.s.i.g. | 200 | 200 | 200 | 500 | 100 |
| WHSV | 29.9 | 30.6 | 10.0 | 29.8 | 30.0 |
| Mole Ratio, $H_2/H'C$ | 5.0 | 4.9 | [2]5.0 | 5.1 | 5.0 |
| Wt. Percent Condensibles | 97.1 | 92.5 | 93.0 | 95.6 | 96.9 |
| Wt. Percent Dry Gas | 2.2 | 6.8 | 6.2 | 3.8 | 2.1 |
| Loss | 0.7 | 0.7 | 0.8 | 0.6 | 1.0 |
| Wt. Percent $iC_5$ based on fresh feed | 20.1 | 35.6 | 39.3 | 27.0 | 20.1 |
| Wt. Percent $nC_5$ based on fresh feed | 76.2 | 49.9 | 47.4 | 67.5 | 75.4 |
| Mole Percent $n-C_5$ remaining | 76.2 | 50.0 | 47.4 | 67.4 | 75.5 |
| Total Conversion, Mole Percent | 23.8 | 50.0 | 52.6 | 32.6 | 24.5 |
| Mole Percent to $iC_5$ | 20.1 | 35.6 | 39.3 | 27.0 | 20.1 |
| Balance, Mole Percent | 3.7 | 14.4 | 13.3 | 5.6 | 4.4 |
| Selectivity | 0.84 | 0.71 | 0.75 | 0.83 | 0.82 |
| $iC_5/nC_5$ | 0.26 | 0.71 | 0.83 | 0.40 | 0.27 |

[1] Condensible liquids analyzed directly by Mass Spec. without LTP.
[2] Catalyst pretreated ca. 16 hrs. with $H_2$+22 mm. Hg vapor pressure of $H_2O$. Test made with $H_2$ containing 22 mm. $H_2O$.

EXAMPLE II

A series of tests was performed employing in each test platinum-alumina catalyst prepared in the manner described in applications Serial Nos. 288,058 and 489,726. The catalyst contained about 0.6 percent by weight of platinum supported on alumina and was 1/16 inch size broken extrudate having a length of about 1/4 inch on the average. The catalyst comprised calcined alumina and the platinum and was characterized by large pore, high area base structure essentially composed of gamma alumina modifications resulting from the drying and calcination of a mixture of precursor hydrous alumina phases containing about 80 percent of trihydrate. The platinum metal was present in sufficiently finely divided form as to exhibit, by X-ray diffraction studies, the substantial absence of crystallites and crystals of size larger than 50 angstrom units and, after calcining and before use, had an area (BET method) of 401 square meters per gram. 100 grams of the catalyst was placed in a reactor, following which the catalyst was purged with nitrogen gas and then reduced in a slow stream of hydrogen gas at about 900° F. and atmospheric pressure.

A series of tests was performed using as a feed a normal pentane fraction which contained 13.7 weight percent of isopentane and 85.2 percent by weight of normal pentane. The operating conditions employed in making the tests, and the test results, are set forth in Table III. At the end of each test, the catalyst was regenerated in order to remove carbonaceous deposits.

It will be noted that test No. 16 produced improved results from the standpoints of conversion and selectivity, in comparison with the other tests, which were not conducted under the preferred test conditions.

TABLE III

| Test No. | 14 | 15 | 16 | 17 |
|---|---|---|---|---|
| Temp., °F. | 875 | 925 | 850 | 850 |
| Press. p.s.i.g. | 50 | 50 | 200 | Atm. |
| WHSV | 0.49 | 2.1 | 1.94 | 2.15 |
| $H_2/H'C$, molar ratio | 3.0 | 3.0 | 3.0 | No $H_2$ |
| $iC_5$ | 31.3 | 42.1 | 51.2 | 12.9 |
| $nC_5$ | 17.0 | 26.6 | 35.3 | 60.9 |
| Total Conversion, Mole Percent | 80.1 | 68.9 | 58.5 | 24.3 |
| Selectivity | 0.26 | 0.48 | 0.75 | 0 |
| Ratio $iC_5/nC_5$ | 1.8 | 1.6 | 1.5 | |

It is claimed:

1. A method for the isomerization of a normal alkane containing from 4 to 6 carbon atoms which comprises bringing the normal alkane in admixture with from about 1 to 5 moles of hydrogen, per mole of normal alkane, into contact with a platinum metal-alumina catalyst at a temperature within the range from about 800 to 900° F., a pressure of from about 200 to 500 p.s.i.g. and a weight hourly space velocity of from about 2 to 20, the said catalyst being characterized by large pore, high area base structure essentially composed of gamma alumina modifications resulting from the drying and calcination of a mixture of precursor hydrous alumina phases containing from about 65% to about 95% of trihydrate, said catalyst containing from about 0.1% to about 1% by weight of a platinum metal, said platinum metal being present in sufficiently finely divided form as to exhibit, by X-ray diffraction studies, the substantial absence of crystallites and crystals of size larger than 50 angstrom units, said catalyst after calcining and before use having an area (BET method) of from about 350 to about 550 square meters per gram.

2. The method of claim 1 in which the platinum metal is platinum.

3. The method of claim 1 in which the platinum metal is platinum and in which said normal alkane is normal pentane.

4. The method of claim 1 in which the platinum metal is platinum and in which the normal alkane is normal butane.

5. The method of claim 1 in which the platinum metal is platinum and in which the normal alkane is normal hexane.

References Cited in the file of this patent

UNITED STATES PATENTS

| | | |
|---|---|---|
| 2,658,028 | Haensel et al. | Nov. 3, 1953 |
| 2,723,947 | Oblad et al. | Nov. 15, 1955 |
| 2,766,302 | Elkins | Oct. 9, 1956 |
| 2,774,744 | Barrett et al. | Dec. 18, 1956 |
| 2,798,105 | Heinemann et al. | July 2, 1957 |
| 2,831,908 | Starnes et al. | Apr. 22, 1958 |
| 2,834,823 | Patton et al. | May 13, 1958 |
| 2,838,444 | Teter et al. | June 10, 1958 |